United States Patent [19]

Graziano

[11] Patent Number: 4,881,082
[45] Date of Patent: Nov. 14, 1989

[54] ANTENNA BEAM BOUNDARY DETECTOR FOR PRELIMINARY HANDOFF DETERMINATION

[75] Inventor: Victor Graziano, Oak Park, Ill.

[73] Assignee: Motorola, Inc., Schaumburg, Ill.

[21] Appl. No.: 163,591

[22] Filed: Mar. 3, 1988

[51] Int. Cl.[4] ............................................... G01S 5/04
[52] U.S. Cl. ....................................... 342/432; 455/33; 379/60
[58] Field of Search ............... 342/432, 445, 463, 465; 455/33; 379/60, 59

[56] References Cited

U.S. PATENT DOCUMENTS

| | | | |
|---|---|---|---|
| H288 | 6/1987 | Gutleber | 342/367 |
| 3,537,011 | 10/1970 | Escoula . | |
| 3,717,814 | 2/1973 | Gans . | |
| 3,745,464 | 7/1973 | Lee . | |
| 3,798,547 | 3/1974 | Reudink . | |
| 3,860,872 | 1/1975 | Richardson et al. . | |
| 3,911,364 | 10/1975 | Langseth et al. . | |
| 4,160,952 | 7/1979 | Seastrand, Jr. . | |
| 4,249,181 | 2/1981 | Lee . | |
| 4,320,535 | 3/1982 | Brady et al. . | |
| 4,373,210 | 2/1983 | Karabinis et al. . | |
| 4,449,192 | 5/1984 | Watanabe et al. . | |
| 4,519,096 | 5/1985 | Cerny, Jr. . | |
| 4,556,760 | 12/1985 | Goldman . | |
| 4,661,993 | 4/1987 | Leland et al. . | |
| 4,667,202 | 5/1987 | Kammerlander | 455/33 |
| 4,694,484 | 9/1987 | Atkinson et al. . | |
| 4,704,734 | 11/1987 | Menich et al. | 379/60 |
| 4,718,081 | 1/1988 | Brenig | 455/33 |

OTHER PUBLICATIONS

Fluhr et al.; "Control Architecture"; Bell System Technical Journal, vol. 58, No. 1, Jan., 1979, p. 43-69.
Ehrlich; "Advanced Mobile Phone Service Using Cellular Technology"; Microwave Journal, Aug., 1983; pp. 119-126.
Lee, "Mobile Cellular Systems Conserve Frequency Resources"; MSN & CT, June, 1985, pp. 139-150.
G.E. Romaine; R.F. Design; pp. 13 & 14; Nov., 1987.
Pierce et al., "Multiple Diversity with Nonindependent Fading", Proceedings of the IRE, Jan., 1960, pp. 89-104.
Porter, "Supervision and Control Features of a Small-Zone Radiotelephone System", IEEE Transactions on Vehicular Technology, vol. 20, No. 3, Aug., 1971, pp. 75-79.

Primary Examiner—Nelson Moskowitz
Assistant Examiner—Gregory C. Issing
Attorney, Agent, or Firm—Raymond A. Jenski; Rolland R. Hackbart

[57] ABSTRACT

An antenna beam boundary detector for a sectorized cellular system is disclosed. The difference in signal level received by a main directional antenna and a broad beamwidth antenna is determined by detecting a modulator signal locally impressed on the signal received by the broad beamwidth antenna. The signal level difference factor is the directional antenna beam boundary when the two antennas are correlated. Interferometer effects are cancelled by detecting both amplitude and phase modulation of the locally impressed modulation.

36 Claims, 5 Drawing Sheets

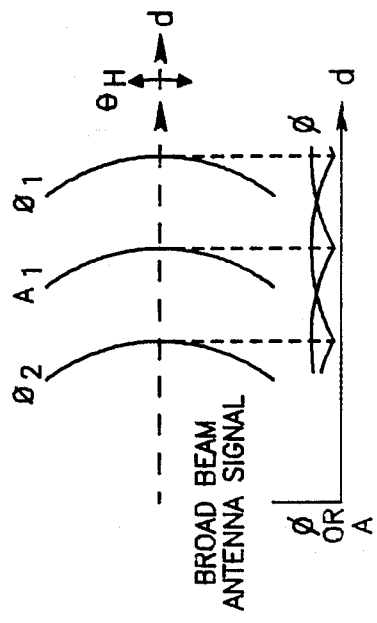
FIG. 7
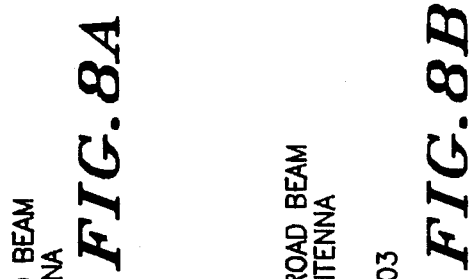
FIG. 8A
FIG. 8B
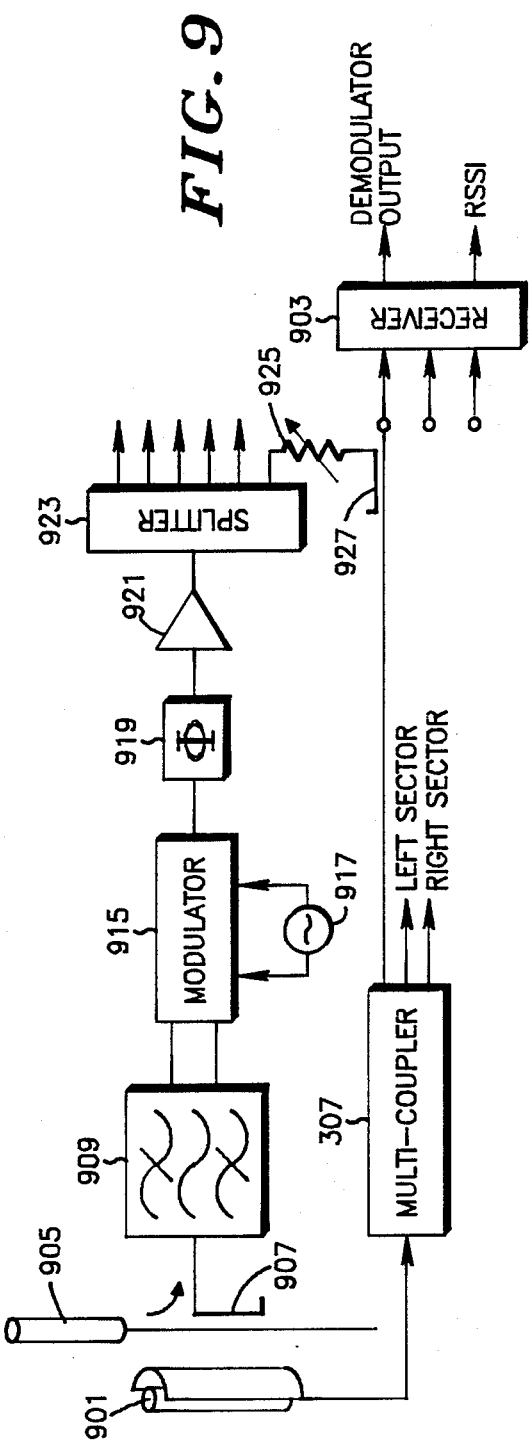
FIG. 9

ANTENNA BEAM BOUNDARY DETECTOR FOR PRELIMINARY HANDOFF DETERMINATION

BACKGROUND OF THE INVENTION

This invention relates generally to location of a remote transmitter by received signal comparison from two correlated antennas and more particularly to the cell boundary determination and subsequent preliminary detection of when a handoff may be necessary in a multicell radiotelephone system utilizing comparison of signals received on correlated antennas having different antenna patterns.

Cellular mobile radiotelephone systems and other multiple radio coverage area systems which provide a continuous radio coverage of a geographic area from a plurality of non-colocated fixed sites characteristically employ an automatic transfer of radio communications capability from one fixed site to another as a remote transceiver unit travels from the radio coverage area of one fixed site to another. This handoff of communications has previously been described for the U.S. cellular radiotelephone service by Fluhr et al., "Control Architecture", Bell System Technical Journal, Vol. 58, No. 1, January 1979, pp. 43-69.

Variations in the overall cellular system design, direction of radio signal illumination, and techniques of cellular system growth have been the subject of several U.S. Pat. Nos., among which are: 3,663,762—Joel, Jr. —"Mobile Communication System"; 3,819,872—Hamrick —"Mobile Telephone Cellular Switching System"; 3,906,166—Cooper et al. —"Radio Telephone System"; 4,128,740—Graziano—"Antenna Array for a Cellular RF Communications System"; and 4,144,411—Frenkiel —"Cellular Radiotelephone System Structured for Flexible Use of Different Cell Sizes". Some of these traditional systems anticipate an increasing number of users with passing time and have developed graceful methods of subdividing and shrinking cell areas to enable multiple reuse of radio frequencies in a fixed geographical area. One of the limitations bounding the number of users in a cell or the smallest area to which a cell can be shrunk is that of the time required to determine the location of the remote unit and process a handoff. Generally, location and handoff need are determined from a periodic sampling of the signal quality received from each remote unit maintaining communications with a fixed station. Such a signal quality measurement may be made by comparison of the signal level above received noise as described in U.S. Pat. Nos. 4,549,311—McLaughlin—"Method and Apparatus for Measuring the Strength of a Radio Signal Frequency" and 4,704,734—Menich et al. —"Method and Apparatus for Signal Strength Measurement and Antenna Selection in Cellular Radiotelephone Systems". Additionally, techniques and equipment designed to enable handoff have been addressed in U.S. Pat. Nos. 4,485,486—Webb et al.—"Method and Apparatus for Assigning Duplex Radio Channels and Scanning Duplex Radio Channels Assigned to Mobile and Portable Radiotelephones in a Cellular Radiotelephone Communications System" and 4,696,027—Bonta—"Handoff Apparatus and Method with Interference Reduction for a Radio System".

However, when the density of the remote units becomes large or when the size of the cells becomes small or when the radio path is cluttered with areas of multipath interference and path obstructions, non-conventional handoff techniques must be employed to reduce the handoff decision time. One technique, addressed in U.S. patent application No. 4,797,947—Labedz —"Microcellular Communications System Using Macrodiversity", issued on Jan. 10, 1989 and assigned to the present assignee, utilizes digital radio systems technology and splits the handoff decision-making process between the fixed equipment and the remote units.

In urban areas and in locations with natural obstructions, it is common for radio signals from conventional cellular remote units to arrive at the fixed site receivers with reflections from nearby objects such as buildings or hills. It is also common for objects to obstruct the radio path from the remote units to the fixed site receivers. In either case, the received signal strength or quality can vary substantially and handoff determination based on signal quality can be subject to error. For example, a transmitting remote unit which moves to a location behind an obstructing building produces a signal strength at a fixed site receiver which decreases significantly, as though the remote unit had traveled beyond the boundary of the cell. A handoff would be initiated by the fixed site when it was unnecessary or improper to hand off the remote unit. A second handoff process would occur when the remote unit moves clear of the obstruction. It is as though the cell boundary were indistinct and holes of coverage could be found within the cell boundaries.

Thus, it is desirable that the boundary of a cell be given more distinct definition. Such definition would provide a reduction of handoff decision processing load in a cellular radiotelephone system.

SUMMARY OF THE INVENTION

It is, therefore, one object of the present invention to define the antenna beam boundary of a cell.

It is a further object of the present invention to reduce the amount of computational effort required in the handoff decision-making process.

It is another object of the present invention to enable the fixed equipment to make a preliminary determination of the need for a handoff without requiring the handoff-controlling element to sample every communications link currently in use in the radio coverage area.

It is a further object of the present invention to receive the signal at the fixed station on two correlated antennas having different antenna patterns and to compare the signal quality so that the antenna pattern beam boundary can be identified.

Accordingly, these and other objects are realized in the present invention which encompasses an antenna beam boundary detector for a cellular radiotelephone system. A first antenna in the system receives a first radio signal from a first geographic area of radio coverage defined by a beam boundary. A second antenna receives a second radio signal, correlated to the first radio signal, from a second geographic area of radio coverage which includes at least part of the first geographic area. The magnitude of the first radio signal is compared with the magnitude of the second radio signal and an output signal is generated when a predetermined relationship exists between the first radio signal magnitude and the second radio signal magnitude.

BRIEF DESCRIPTION OF THE DRAWINGS

FIG. 7 is a combined polar graph and rectilinear graph showing phase and amplitude modulation maxima and minima which may arise due to interferometer effects.

FIGS. 8A and 8B illustrate signal modulation vectors when the phase between the main directional antenna and the broad beam antenna signals are at $\pi/2$ and 0 respectively.

FIG. 9 is a block diagram of the circuits of the present invention which modulate the broad beamwidth antenna signal and which couple that signal to the main directional antenna signal.

DESCRIPTION OF THE PREFERRED EMBODIMENT

Figure 1:
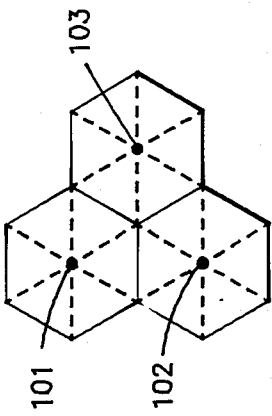
FIG. 1 is a diagram of a conventional sectorized 3-cell pattern, center illuminated, which may employ the present invention.

FIG. 1 depicts a stylized three cell cellular system configuration. Each of the three cells is illuminated from a center point (101, 102, and 103) where fixed site radio and control equipment are typically found. Each of the three hexagonal cells is further divided into six sectors, each sector illuminated from a directional antenna at the center point. Further description of such a cellular system may be found in U.S. Pat. No. 4,128,740.

Figure 2:
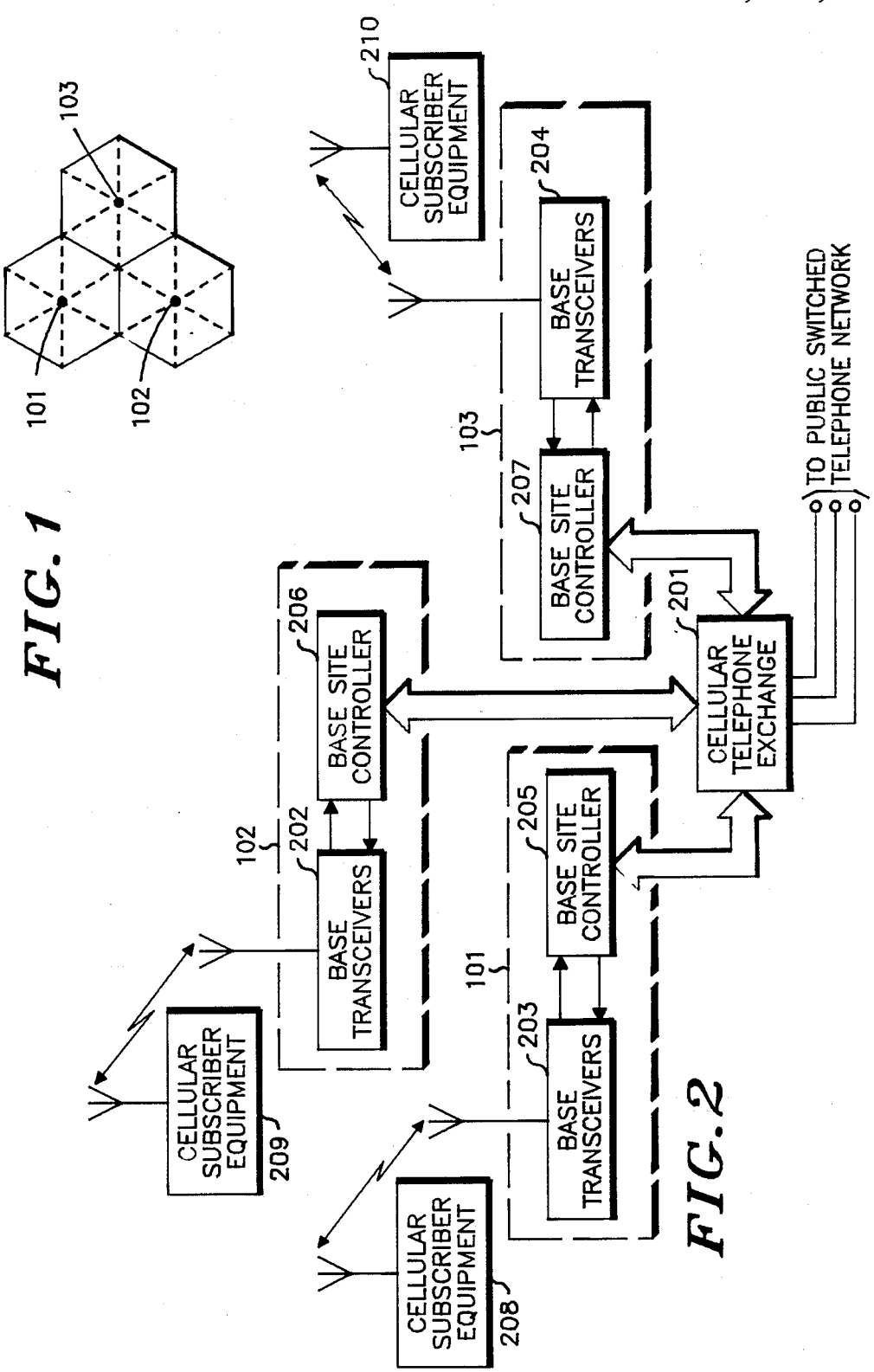
FIG. 2 is a block diagram of equipment which may be utilized in the cellular system of FIG. 1 and which may employ the present invention.

At each of the center sites 101–103 fixed equipment which may be found in a typical cellular system is shown in block diagram form in FIG. 2. Telephone call routing and public switch telephone network interface may be performed by a cellular telephone exchange 201, such as an EMX 500, marketed by Motorola, Inc., which accepts a telephone call from either the public switch telephone network or the radio system and routes the call to its proper destination. Connected t the cellular telephone exchange 201 are a plurality of fixed base station radio transmitters and receivers shown as transceiver groups 202, 203, and 204 which are more directly under the control of a base site controller such as base site controllers 205, 206, and 207 for each transceiver group at the center point in the cellular system. In the preferred embodiment, each base site controller also controls the assignment of mobile or portable radiotelephones, known collectively as remote units or cellular subscriber equipment (CSE), to one of the radio channels which is available in the cell in which a CSE is located.

The plurality of fixed site transceivers are conventionally assigned tasks of transmitting signals to the CSEs and receiving signals from the CSEs on duplex radio channels commonly known as voice channels. Furthermore, to control the requests of CSEs for service and to convey assignments of voice channels, one of the transceivers of a transceiver group may be assigned the task of transmitting commands on half of a duplex radio channel commonly used in cellular systems, and receiving requests on the other half of the duplex channel.

If the cell is further divided into sectors, as illustrated in FIG. 1, a subdivision of transceivers is made such that some duplex channels are transmitted into and received from a first sector, some other duplex channels are transmitted into a second sector, and so forth. Thus, to serve a CSE 208, one fixed site transceiver of transceiver group 203 is coupled to a directional antenna to receive and transmit a voice channel from and to CSE 208. As the CSE 208 travels from one cell to another or from one sector to another it is instructed to tune to one of the voice channels available to the CSE in that cell via a handoff process.

One realization of the present invention employs fixed site equipment (that equipment found at the center illumination point of each cell) such as that found in aforementioned U.S. Pat. No. 4,694,484. Additionally, the cellular subscriber equipment (remote units) may be mobile or portable radio transceivers. The mobile radio equipment may be that described in Motorola Instruction Manual No. 68P81039E25 published by Motorola Service Publications, Schaumburg, Ill. and the portable cellular radio equipment may be that described in Motorola Instruction Manual No. 68P81046E60-B, published by Motorola Service Publications, Schaumburg, Ill.

Figure 3:
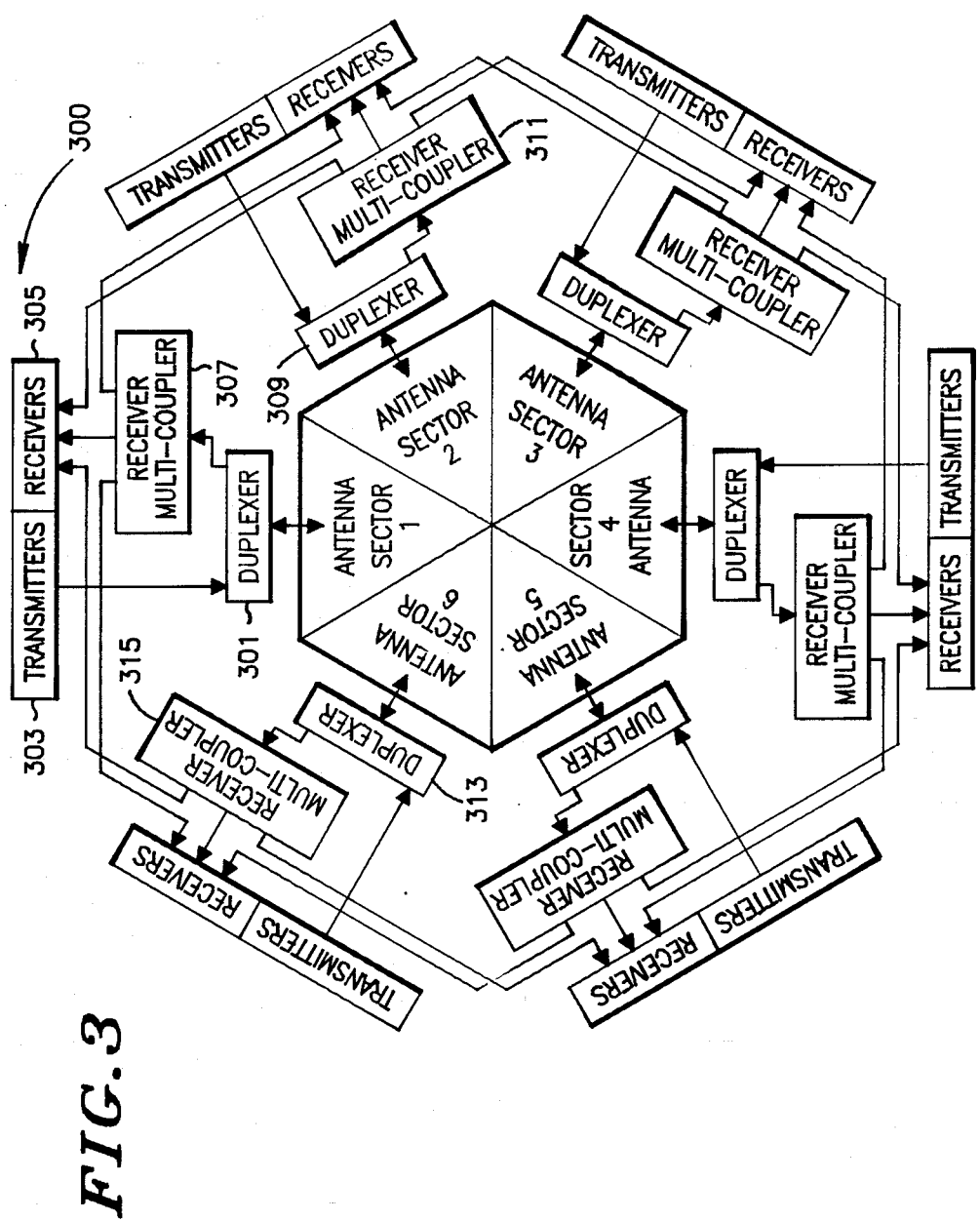
FIG. 3 is a block diagram of the arrangement of equipment in a sectorized cellular system.

A more detailed block diagram showing interconnection between the fixed site transceivers and the directional antennas which produce sector cell coverage is shown in FIG. 3. Here, transceivers 300 are part of the group of transceivers 203 which are the fixed radio equipment of the cell centered at center site 101. Taking antenna sector 1 as the representative sector to which transceivers 300 are coupled, a directional antenna providing coverage for the sector of this cell is coupled to a duplexer 301, which enables transmitters 303 of transceivers 300 to be coupled to the antenna while allowing simultaneous operation of receivers 305 of transceivers 300 from the same antenna. Signals received on the antenna of sector 1 are coupled through duplexer 301 to receiver multicoupler 307. Receiver multicoupler 307 provides both signal amplification and signal distribution to both the receivers operating in sector 1 (receivers 305) and receivers operating in sector 6 (left of sector 1) and receivers operating in sector 2 (right of antenna sector 1). Thus it can be seen that CSE (cellular subscriber equipment) 208 operating in the cell served from the center site 101 and in sector 1 of this cell can be received by receivers 305 not only through receiver multicoupler 307 but also by the antenna of sector 2 through duplexer 309 and receiver multicoupler 311 as well as from an antenna in sector 6 through duplexer 313 and receiver multicoupler 315. Thus, receivers 305 may select an antenna from sector 1 or sector 2 or sector 3. If receivers 305 have diversity capability, it is possible that the signals received by any of the three sector antennas may be combined in conventional fashion.

Such an arrangement of receivers as shown in FIG. 3 may aid in the handoff of cellular subscriber equipment moving from one sector to another. By comparing the signal strength or signal quality realized at receivers 305 from the antennas of sectors 1, 2, and 6, it is possible to determine when a cellular subscriber equipment has moved, for example, from sector 1 to sector 6. Such a sector-sector handoff, however, requires the measurement of signal strength or quality and handoff processing by the base site controller 205. Furthermore, such sector-sector handoff process necessitates a continuing signal quality measurement process by the base site controller 205 and the receivers 305 thereby tying up processing time which could be used for other purposes. The present invention removes this need for periodic signal strength or quality measurement by the base site controller and receivers by determining on the basis of the need of each CSE that a handoff may be necessary. This saves the processing time which would be required for periodic signal strength or quality measurement.

Figure 4:
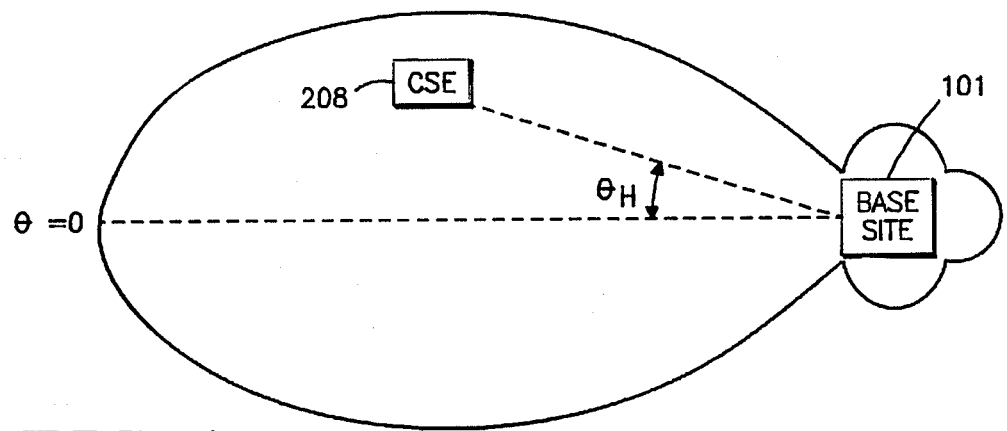
FIG. 4 is a polar graph of a directional antenna beam which may be employed in the present invention.

FIG. 4 shows a typical horizontal pattern for a directional antenna which may be utilized in one sector of a cell. Antenna horizontal patterns are conventionally plotted on polar coordinate graphs where the position around the antenna at one vertical elevation is represented by an angle $\theta_H$ and the strength of the signal received (or transmitted) is represented by the tip of the vector centered at the center of the polar graph This antenna pattern can be equated to the area from which an antenna can receive (or to which an antenna can transmit). The antenna beam boundary, therefore, is a boundary of the antenna pattern representing a constant signal strength magnitude received at the antenna (or transmitted from the antenna). As the cellular subscriber equipment 208 travels within the antenna pattern of the sector its bearing, $\theta_H$, from the "boresight" or point of maximum antenna gain yields a signal strength which is somewhat reduced from th maximum signal strength found at the boresight ($\theta_H=0$. The present invention utilizes this deviation of signal strength based on the angle of deviation from the directional antenna boresight by comparing the signal strength received by the directional antenna of one sector to the signal strength received by a correlated omnidirectional antenna.

As described previously, the problem faced is that of measuring the signal strength or quality well enough to define the cell or sector in which the CSE is operating and of determining in advance that a handoff may be necessary. Conventional methods of signal strength or quality have suffered from perturbations in the radio signal field such as those produced by obstructions to the radio signal path (buildings, hills, vehicles, humans, etc.) or those produced by reflections of the radio signal from reflecting surfaces (buildings, hills, etc.). An expected clear radio path, then, might be obstructed by one building while a second radio path may be created by reflection from a second building. Thus, a handoff of a CSE may be prescribed for a CSE with a low signal quality due to an obstruction in a location which otherwise should not require a handoff. Likewise, a signal reflection or other constructive interference may produce an extraordinarily high signal quality in a location where a CSE otherwise should be handed off to another cell or sector.

The perturbation (P) of the radio field, therefore, leads to a very indistinct boundary between sectors and cells (and holes within cells or sectors) which undesirably increase the number of handoffs and handoff requests. The present invention addresses the indistinctness of the cell boundaries by better definition of the boundaries via a comparative measurement of signal strength or quality.

Figure 5:
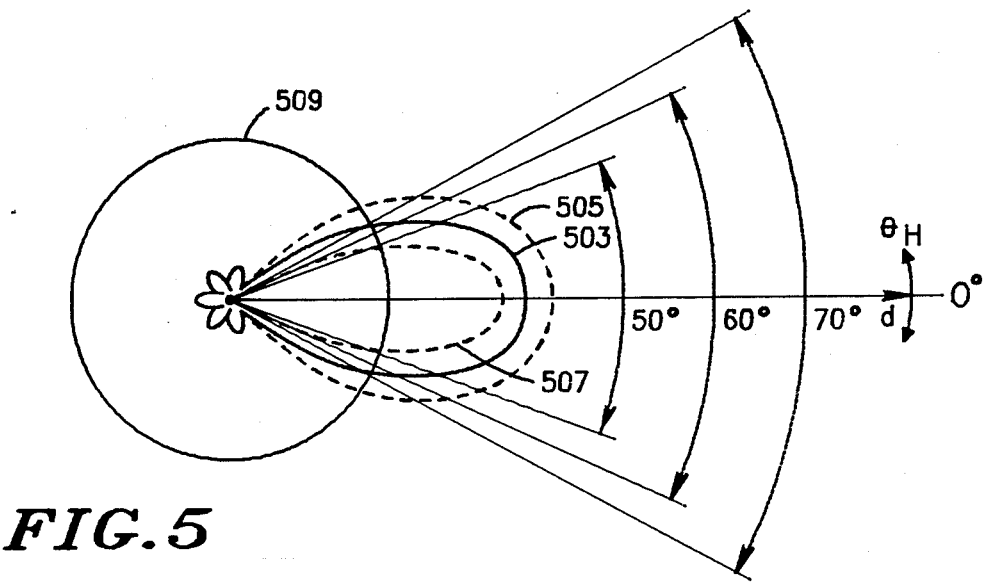
FIG. 5 is a polar graph of a directional antenna beam superimposed on a polar graph of an omnidirectional antenna beam.

Referring now to FIG. 5, the antenna patterns of two antennas, an omnidirectional 509 and a directional 503, are graphed on a polar plot of signal strength. If the omni and the directional antennas are completely correlated, the signal received by one tracks the signal received by the other. The only difference, then, would be the antenna gain as shown in FIG. 5. Complete correlation is difficult to achieve in practice from two separate antennas; a correlation of greater than 0.7 between signals from the two antennas is sufficient for the preferred embodiment of the invention. Although an omnidirectional antenna is shown, an antenna having directional characteristics may also be used. Such a broad beamwidth antenna must have vertical and horizontal patterns which generally encompass the directional antenna pattern beamwidth of the main directional antenna.

As a CSE moves from the boresight of the directional antenna ($\theta_H=0$) the strength or quality of the received signal diminishes in accordance with the antenna pattern. This same change of angle from boresight ($\theta H=0$) for the omnidirectional (or broad beamwidth) antenna produces essentially no change in received signal strength or quality. Changes in radial distance d from either antenna and changes in the perturbed field P (because of the correlation between antennas) produce equal changes in the signal received at either antenna. Thus, the signal received by the directional antenna ($S_D$) is a function of the horizontal angle from boresight ($\theta_H$), the vertical angle from boresight $\theta_V$), the distance from the antenna (d), and perturbations in the field (P):

$$S_D=f(\theta_H,\theta_V, d,P).$$

Similarly, the signal received by the omnidirectional antenna ($S_O$) is a function of distance (d), vertical angle from boresight ($\theta_V$), and field perturbation (P):

$$S_O=f(d,\theta_V,P).$$

When the antennas are perfectly correlated, the signal received by the two antennas are proportionally related by a constant (k) which may be set to a preselected beam boundary value of the omnidirectional (broad beamwidth) antenna pattern:

$$S_D|_{\theta_H,\theta_V,}{}^d=kS_O$$

Therefore, if the signal received from the omnidirectional (broad beamwidth) antenna is compared to the signal received from the directional antenna, the proportionality constant, k, can be established and the boundary of the beam of the directional antenna can be determined without the effects of field perturbations affecting the determination. In the preferred embodiment, this comparison is done in a single receiver configuration. Further, in the preferred embodiment of the present invention, k is adjusted to between 3 and 7 dB, however, these are merely nominal values and may be selected to meet the system designer's requirements.

It can be seen that by changing the proportionality constant, k, different directional antenna beam boundaries can be defined. This effect enables the designer of a sectorized cellular system to change the size and angle of sector covered by a particular directional antenna to be varied to meet special interference or topographic needs. The broken line directional antenna patterns 505 and 507 of FIG. 5 illustrate increasing and decreasing angles and areas of coverage.

Figure 6:
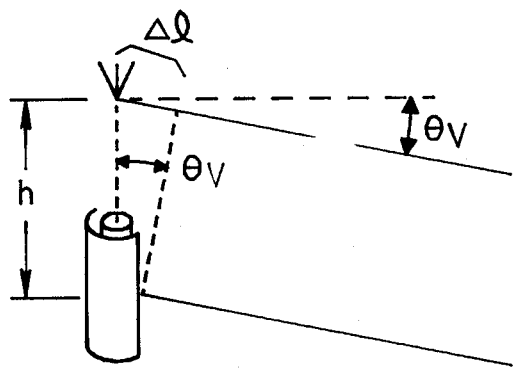
FIG. 6 is a diagram of radio signal rays to a directional and a broad beam antenna system illustrating how an interferometer effect may arise.

If the directional antenna and the broad beam antenna are not exactly colocated but are separated by a vertical separation, h, there will appear some places within the directional beam where an interferometer effect will occur. This effect is best understood while referring to FIG. 6. A change in the vertical angle, $\theta_V$, results in a path length difference $\Delta l$, due to the vertical separation of the antennas, h. The path length difference $\Delta l$, can be calculated geometrically as:

$$\Delta l = h \sin\theta_V$$

The phase difference, $\Psi$, can be calculated from the path length difference as:

$$\Delta\Psi_V = (1/k)(2\pi\Delta l) = (1/k)(2\pi h \sin\theta_V)$$

Viewing the modulation introduced by modulator 915 as a varying phase angle on a signal vector as shown in FIGS 8A and 8B, the phase angle $\Psi$ between the signal vector from the directional antenna 801 and the broad beam antenna signal vector 803 will change as the vertical angle, $\theta_V$, changes. Thus, if it is assumed that $\Psi = \pi/2$ at boresight ($\theta_V = 0$) the resulting vector, R, contains mostly an amplitude modulation as shown in FIG. 8A. At other angles of $\theta_V$, the broad beam antenna signal vector may add as shown in FIG. 8B, resulting in mainly phase modulation in the resulting vector R.

The phase shift introduced by phase shifter 919 can be adjusted for a maximum constructive interference (broad beam antenna signal amplitude) at a selected vertical angle, $\theta_V$. In the preferred embodiment, this selected angle is at th cell center. Then, the total phase difference is:

$$\Delta\Psi_T = \Phi + n\Psi_V = n\pi/2.$$

where n=1,3,5, ... for maxima in phase modulation of the broad beam antenna signal and n=2,4,6, ... for maxima in amplitude of the broad beam antenna signal.

The result of the interferometer effect can be seen in FIG. 7. Maxima and minima of phase and amplitude occur at different values of the distance, d, from the cell center (corresponding to different values of $\theta_V$). Crests of constructive interference of phase ($\phi_1$, $\phi_2$) and of amplitude ($A_1$) are illustrated for different values of $\theta_H$ and d. The present invention advantageously uses the fact that the phase maxima occurs at the amplitude minima and vice versa to cancel the interferometer effect.

Referring now to FIG. 9, the preferred embodiment of the radio frequency portion of the antenna signal comparison circuitry is shown in block diagram form. A signal received from CSE 208 (shown in FIG. 2) is conventionally received on a directional sector antenna 901 and coupled via multi-coupler 307 to a receiver 903 tuned to the receive channel on which CSE 208 has been assigned to transmit. Receiver 903 is part of the larger grouping of fixed site equipment identified previously as base transceivers 203. The same signal from CSE 208 is received on broad bandwidth antenna 905 (which may be the signalling antenna of the cell) and coupled via a conventional directional coupler 907 to a bandpass preselector filter 909. In the preferred embodiment the preselector 909, which operates over the common fixed site receive frequencies, provides a passband of approximately 20 MHz to pas all desired received signals within the band and reject signals outside this band. A conventional phase modulator 915 may be used to impress a baseband frequency ($M_L$) from oscillator 917 onto each signal received on antenna 905—including that received from CSE 208. (It should be apparent to those skilled in the art that modulator 909 may also be an amplitude modulator). This composite signal is coupled to variable phase shifter 919 which adjusts the phase of the signal received on the broad beamwidth antenna. After amplification by amplifier 921, the composite signal is divided among the receivers of fixed site transceivers 203 by splitter 923, including a division of signal to receiver 903. A variable attenuator 925 may be employed at this point to adjust the signal level being coupled to receiver 903 (via conventional coupler 927). This adjustment, in addition to the difference in horizontal and vertical gains of the antennas 905 and 901 establishes the proportionality constant k.

Figure 10:
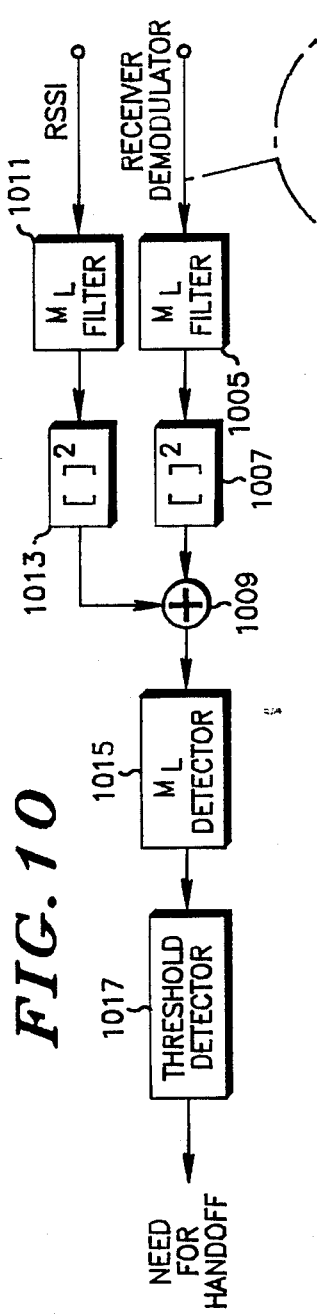
FIG. 10 is a block diagram of the circuits which detect the signal magnitude difference between the two antennas in the present invention.

The receiver 903 produces a received signal strength indicator (RSSI) output of $M_L$ proportional to the amplitude modulation on the broad beamwidth antenna signal and a demodulator output which has a magnitude of $M_L$ proportional to the phase modulation of the broad beamwidth antenna signal. The receiver 903 demodulator output contains the signal modulating the transmitter of CSE 208, a SAT (supervisory audio tone—used in conventional cellular systems to indicate presence of CSE transmission and to reduce cochannel interference) signal, and the local modulating signal from oscillator 917. The SAT signal and the local modulating signal ($M_L$) are shown in FIG. 10 as signal 1001 and signal 1003 having magnitudes of $E_1$ and $E_M$, respectively. The receiver demodulator output signal is applied to a filter 1005 which passes the local modulating signal ($M_L$) to conventional signal squaring circuit 1007 and conventional summing circuit 1009. The RSSI signal of the receiver 903 is coupled via a conventional filter 1011 tuned to the frequency $M_L$, to conventional signal magnitude squarer 1013 and conventional signal summer 1009 before being presented to $M_L$ detector 1015. (In this way a modulation signal $M_L$ having the interferometer effect removed may be detected for determining the directional antenna beam boundary). The amplitude of composite signal $M_L$ is determined by detector 1015 by one of commonly known techniques such as amplitude detection. The detected amplitude is coupled to a conventional threshold detector 1017 which provides a need for handoff signal to handoff processing equipment when the amplitude of $M_L$ increases above a predetermined level. The amplitude of $M_L$ is related to the proportion of signal received by the directional antenna to the signal received by the broad beamwidth signal. Thus when the ratio of the directional antenna signal and the broad beamwidth antenna signal equals the predetermined proportionality constant, k, as detected by the threshold detector detection of $M_L$ amplitude level, a handoff process may begin.

Figure 11:
FIG. 11 is an alternative to FIG. 9 in which the main directional antenna beam width is down-tilted.
Figure 12:
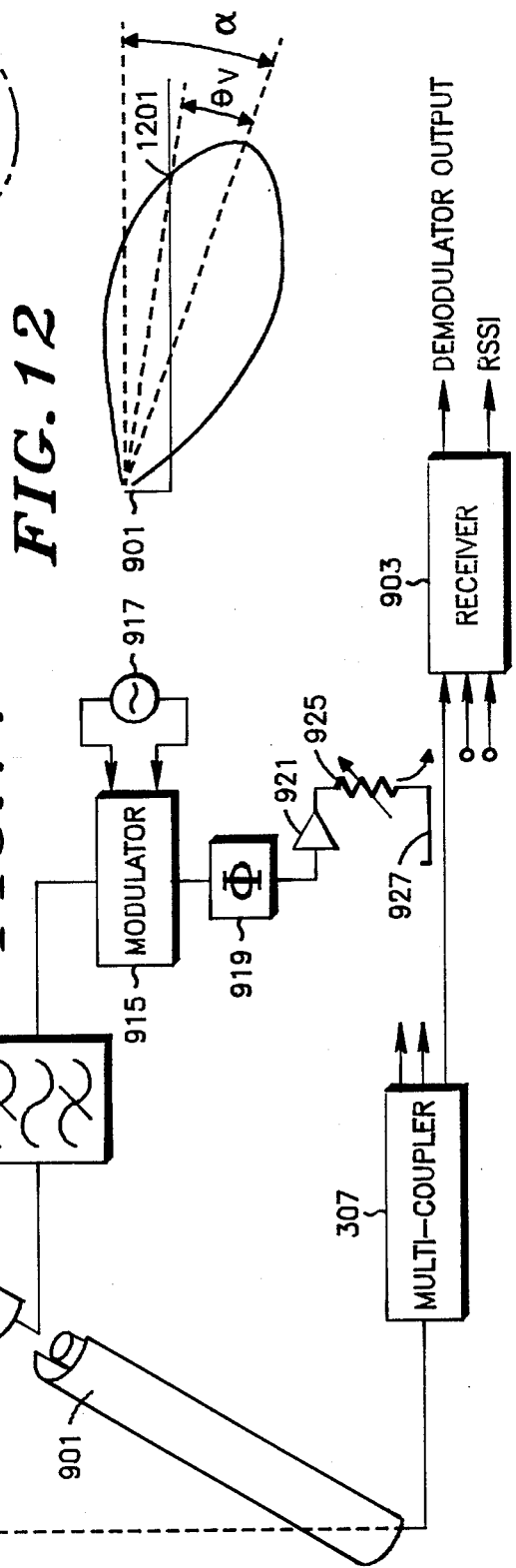
FIG. 12 is an illustration of the vertical beamwidth of the down-tilted antenna of FIG. 11.

Increased control over the directional antenna beam may be realized as shown in FIG. 11. In this implementation of the present invention, the directional antenna beam is tilted down by a small angle, α, so that the maximum extent of the cell is limited (at point 1201 of FIG. 12) by the top of the vertical beam width $\theta_V$ as shown in FIG. 12. In this way, interference to adjacent cells may be reduced.

As shown in FIG. 11, the main directional antenna 901 and a broad beamwidth antenna 1101 are tilted from vertical by an angle α thereby aiming the boresight of the vertical beamwidth of the main directional antenna below the horizon. In the present invention, the angle α may be between 0° and 7°, although greater angles can be used. Although shown diagrammatically as a mechanical tilting, the same effect may be realized by commonly known electronic beam tilting techniques. Additionally, the broad beamwidth antenna is also shown down tilted. This is also for convenience; the vertical beamwidth of the broad beamwidth antenna may be broad enough to encompass the vertical beamwidth of the main directional antenna 901 so that such down tilting of the broad beamwidth antenna 1101 becomes unnecessary.

In summary, then, an antenna beam boundary detector has been shown and described. In a sectorized cellular system, it is important to define the fixed site directional antenna beam in order that the processing of spurious handoffs be reduced. This is accomplished in the present invention by comparing the received signal strength of the directional antenna to the received signal strength of a correlated broader beamwidth antenna. Because the signals are correlated, the magnitude difference between the signals is essentially related only to the difference in antenna pattern. If a constant magnitude difference factor is chosen, the directional antenna beamwidth is defined by the chosen constant.

Measurement of the signal strength difference factor is achieved by phase modulating a local modulation signal on the signal received from the broad beamwidth antenna and combining the modulated signal with the signal from the main directional antenna. Since an interferometer effect may occur between antennas, both the amplitude modulation and the phase modulation is combined before detection of the unmodulated local modulation signal. When the level of the unmodulated local modulation signal exceeds a predetermined threshold (determined by the desired difference factor), a handoff need is indicated. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

I claim:

1. An antenna beam boundary detector for a cellular radiotelephone system employing a plurality of cells, comprising:
   a first antenna receiving a first radio signal from a first geographic area of radio coverage defined by a beam boundary;
   a second antenna receiving a second radio signal geographic area of radio coverage including at least part of said first geographic area, said second radio signal having a high correlation to said first radio signal at said first and second antennas;
   means for comparing a magnitude of said first radio signal with a magnitude of said second radio signal; and
   means, responsive to said means for comparing, for generating an output signal when a predetermined magnitude relationship exists between said first radio signal magnitude and said second radio signal magnitude thereby detecting said beam boundary.

2. An antenna beam boundary detector in accordance with claim 1 wherein said plurality of cells further comprises at least one sector cell.

3. An antenna beam boundary detector in accordance with claim 1 wherein said first antenna further comprises a directional antenna.

4. An antenna beam boundary detector in accordance with claim 1 wherein said first antenna further comprises an antenna having a down-tilted vertical beam pattern.

5. An antenna beam boundary detector in accordance with claim 1 wherein said second antenna further comprises an broad beam antenna.

6. An antenna beam boundary detector in accordance with claim 1 wherein said means for comparing further comprises means for modulating said second radio signal with a local modulating signal.

7. An antenna beam boundary detector in accordance with claim 6 wherein said means for comparing further comprises means for combining said first radio signal and said modulated second radio signal.

8. An antenna beam boundary detector in accordance with claim 7 wherein said means for comparing further comprises means for demodulating said combined first and second radio signals to recover said local modulating signal.

9. An antenna beam boundary detector in accordance with claim 8 wherein said means for generating further comprises means for detecting an amplitude of said recovered local modulating signal and for comparing said detected local modulating signal amplitude to a predetermined threshold.

10. An antenna beam boundary detector in accordance with claim 8 wherein said means for demodulating further comprises both phase and amplitude demodulating means to recover a portion of said local modulating signal which is phase modulated and a portion of said local modulating signal which is amplitude modulated.

11. An antenna beam boundary detector in accordance with claim 10 wherein said means for generating further comprises means for detecting a combined amplitude of said recovered phase modulated portion of said local modulating signal and said recovered amplitude modulated portion of said local modulating signal.

12. An antenna beam boundary detector in accordance with claim 11 wherein said means for generating further comprises means for comparing said detected combined amplitude to a predetermined threshold.

13. An antenna beam boundary detector in accordance with claim 1 wherein said first antenna and said second antenna further comprise an antenna array with one of said antennas disposed a predetermined vertical distance above the other.

14. An antenna beam boundary detector in accordance with claim 13 wherein said means for comparing further comprises means for cancelling an interferometer effect resulting from said vertical disposition of said antennas.

15. A cellular radiotelephone system antenna beam boundary handoff detector for sectorized cells, comprising:

at least one directional antenna receiving a first radio signal from a first geographic area of radio coverage defined by a beam boundary;

a broad beam antenna receiving a second radio signal from a second geographic area of radio coverage including at least part of said first geographic area, said second radio signal having a high correlation to said first radio signal at said first and second antennas;

means for comparing a magnitude of said first radio signal with a magnitude of said second radio signal; and means, responsive to said means for comparing, for generating an output signal when said second radio signal magnitude exceeds a predetermined proportion of said first radio signal magnitude thereby determining said beam boundary.

16. A cellular radiotelephone system antenna beam boundary handoff detector in accordance with claim 15 wherein said at least one directional antenna further comprises a directional antenna having a down-tilted vertical beam pattern.

17. A cellular radiotelephone system antenna beam boundary handoff detector in accordance with claim 15 wherein said means for comparing further comprises means for modulating said second radio signal with a local modulating signal.

18. A cellular radiotelephone system antenna beam boundary handoff detector in accordance with claim 17 wherein said means for comparing further comprises means for combining said first radio signal and said modulated second radio signal.

19. A cellular radiotelephone system antenna beam boundary handoff detector in accordance with claim 18 wherein said means for comparing further comprises means for demodulating said combined first and second radio signals to recover said local modulating signal.

20. A cellular radiotelephone system antenna beam boundary handoff detector in accordance with claim 19 wherein said means for generating further comprises means for detecting an amplitude of said recovered local modulating signal and for comparing said detected local modulating signal amplitude to a predetermined threshold.

21. A cellular radiotelephone system antenna beam boundary handoff detector in accordance with claim 19 wherein said means for demodulating further comprises both phase and amplitude demodulating means to recover a portion of said local modulating signal which is phase modulated and a portion of said local modulating signal which is amplitude modulated.

22. A cellular radiotelephone system antenna beam boundary handoff detector in accordance with claim 21 wherein said means for generating further comprises means for detecting a combined amplitude of said recovered phase modulated portion of said local modulating signal and said recovered amplitude modulated portion of said local modulating signal.

23. A cellular radiotelephone system antenna beam boundary handoff detector in accordance with claim 22 wherein said means for generating further comprises means for comparing said detected combined amplitude to a predetermined threshold.

24. A cellular radiotelephone system antenna beam boundary handoff detector in accordance with claim 15 wherein said at least one directional antenna and said broad beam antenna further comprise an antenna array with one of said antennas disposed a predetermined vertical distance above the other.

25. A cellular radiotelephone system antenna beam boundary handoff detector in accordance with claim 24 wherein said means for comparing further comprises means for cancelling an interferometer effect resulting from said vertical disposition of said antennas.

26. An antenna beam boundary detector for a cellular radiotelephone system employing a plurality of cells, comprising:

an antenna array further comprising a first antenna and a second antenna, one of said antennas disposed a predetermined vertical distance above the other, said first antenna adapted to receive a first radio signal from a first geographic area of radio coverage defined by a beam boundary and said second antenna adapted to receive a second radio signal from a second geographic area of radio coverage including at least part of said first geographic area, said second radio signal having a high correlation to said first radio signal at said first and second antennas;

means for modulating said second radio signal with a local modulating signal;

means for shifting the phase of said modulated second radio signal;

means for combining said modulated and phase shifted second radio signal and said first radio signal;

means for phase and amplitude demodulating said combined first and second radio signals to recover said local modulating signal;

means for detecting a recovered amplitude of said local modulating signal from said means for phase and amplitude demodulating; and means for comparing said detected amplitude to a predetermined threshold.

27. A method of detecting an antenna beam boundary in a cellular radiotelephone system employing a plurality of cells, comprising the steps of:

receiving a first radio signal on a first antenna having a first geographic area of radio coverage defined by a beam boundary;

receiving a second radio signal on a second antenna having a second geographic area of radio coverage including at least part of said first geographic area, said second radio signal having a high correlation to said first radio signal at said first and second antennas;

comparing a magnitude of said first radio signal with a magnitude of said second radio signal; and generating an output signal in response to said comparing step when a predetermined magnitude relationship exists between said first radio signal magnitude and said second radio signal magnitude thereby detecting said beam boundary.

28. A method in accordance with the method of claim 27 wherein said comparing step further comprises the step of modulating said second radio signal with a local modulating signal.

29. A method in accordance with the method of claim 28 wherein said comparing step further comprises the step of combining said first radio signal and said modulated second radio signal.

30. A method in accordance with the method of claim 29 wherein said comparing step further comprises the steps of demodulating said combined first and second radio signals and recovering said local modulating signal.

31. A method in accordance with the method of claim 29 wherein said generating step further comprises the steps of detecting an amplitude of said recovered local modulating signal and comparing said detected local modulating signal amplitude to a predetermined threshold.

32. A method in accordance with the method of claim 29 wherein said demodulating step further comprises the steps of phase demodulating and amplitude demodulating said combined first and second radio signals and recovering a portion of said local modulating signal which is phase modulated and a portion of said modulating signal which is amplitude modulated.

33. A method in accordance with the method of claim 32 wherein said generating step further comprises the step of detecting a combined amplitude of said recovered phase modulated portion of said local modulating signal and said recovered amplitude modulated portion of said local modulating signal.

34. A method in accordance with the method of claim 33 wherein said generating step further comprises the step of comparing said detected combined amplitude to a predetermined threshold.

35. A method in accordance with the method of claim 27 further comprising the step of disposing one of said first and second antennas a predetermined vertical distance above the other.

36. A method in accordance with the method of claim 35 wherein said comparing step further comprises the step of cancelling an interferometer effect resulting from said vertical disposition of said antennas.

* * * * *

UNITED STATES PATENT AND TRADEMARK OFFICE
CERTIFICATE OF CORRECTION

PATENT NO. : 4,881,082

DATED : Nov. 14, 1989

INVENTOR(S) : Victor Graziano

It is certified that error appears in the above-identified patent and that said Letters Patent is hereby corrected as shown below:

Col. 9, line 62, insert --from a second-- before the word "geographic".

Signed and Sealed this

Sixteenth Day of October, 1990

Attest:

HARRY F. MANBECK, JR.

*Attesting Officer*      *Commissioner of Patents and Trademarks*